Figure 2:
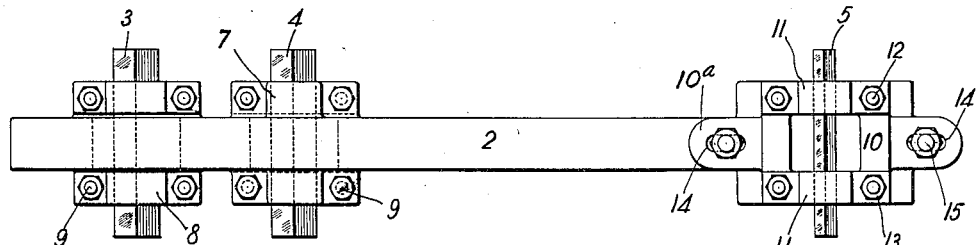

A. M. GULL.
SCALE MECHANISM.
APPLICATION FILED NOV. 17, 1913.

1,124,610.

Patented Jan. 12, 1915.

WITNESSES
R. Little
Chas. Josterman

INVENTOR
A. M. Gull
by Linthicum Beck & Fuller
his Attorneys

UNITED STATES PATENT OFFICE.

ALEXANDER M. GULL, OF LORAIN, OHIO.

SCALE MECHANISM.

1,124,610.  Specification of Letters Patent.  Patented Jan. 12, 1915.

Application filed November 17, 1913. Serial No. 801,399.

*To all whom it may concern:*

Be it known that I, ALEXANDER M. GULL, of Lorain, in the county of Lorain and State of Ohio, have invented a new and useful Scale Mechanism, of which the following is a specification.

My invention relates to the construction of scales, and more particularly relates to the construction of the pivot pins, bearings, and shackles forming parts of the scales, and by which the scale levers and scale beams are assembled and are connected into operative relation. Heretofore, with such scales, the pivot pins have been made rectangular in cross section and tapering lengthwise so as to permit of their being driven into tapering holes provided in the scale beams and scale levers and necessarily on account of the taper, one edge only of the pivot pins being sharpened for service by engagement with the pivot bearings. It has also been the practice to tightly fit pieces of hardened steel into the shackles forming part of the scale mechanism to provide bearings for engagement with the pivot pins. When in such construction the pivot pins become worn or the bearings in the shackles become loosened or become cut or grooved by long use it is necessary to dismantle the scale, and remove the levers and shackles to a repair shop in order to insert new pivot pins and fit the new bearings in place therein to again enable the scale to be accurately balanced as is essential to obtain accurate results in weighing with the scale.

One object of my invention is to provide a scale mechanism having pivot pins of novel construction and having improved means for securing the pivot pins in position in the scale levers, whereby the life of the pivot pins is materially increased, the difficulties heretofore encountered in renewing the pivot pins are avoided, the rapid renewal and adjustment of the pivot pins in the scale levers without dismantling the scale beams or levers is effected, and the loss of time in the use of the scale is lessened and prevented.

Another object of my invention is to provide a scale shackle and bearing mechanism of improved construction whereby the removal and replacement of the bearings and pivot pins are facilitated, the time required in making repairs and adjustments is lessened and the cost of maintaining the scale mechanism in alinement so as to obtain accurate weighing is very greatly reduced.

Still further objects of my invention will become apparent as the invention is more fully described hereinafter.

The invention consists in providing a pivot pin which is rectangular in cross section and which has parallel sides, and in clamping the pivot pins in position on the scale levers so that the ready removal and replacement is effected.

The invention further consists in providing a shackle having pivot pin bearings removably and adjustably secured therein whereby renewal and adjustment of the bearings in the shackle without dismantling the scale mechanism, is made possible.

Figure 1:
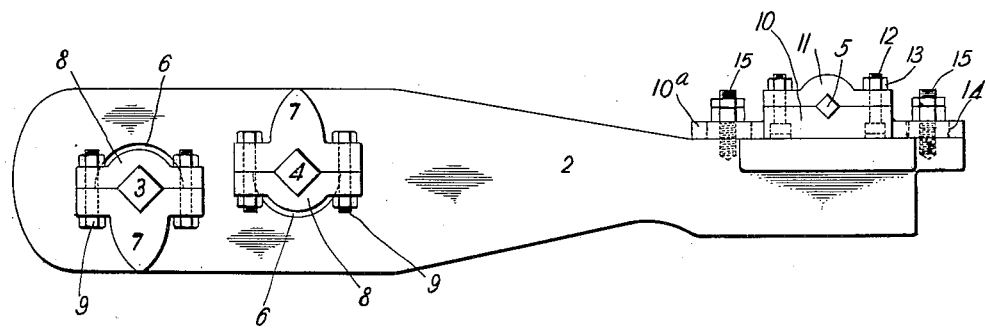
Figure 3:
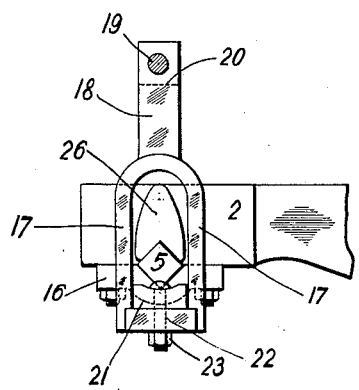
Figure 4:
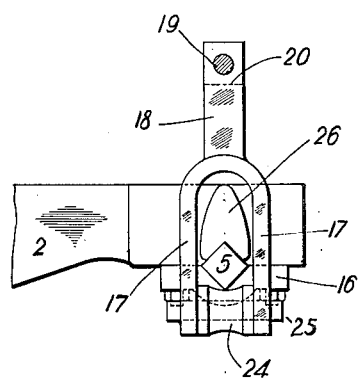
Figure 5:
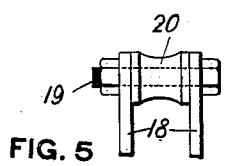

Referring to the accompanying drawings, Figure 1 is a longitudinal side elevation of a scale lever having pivot pins forming part thereof constructed and arranged and secured in position therein in accordance with my invention. Fig. 2 is a plan of the scale lever shown in Fig. 1. Fig. 3 is a detail side elevation showing a shackle and pivot pin bearing as constructed and applied for use on the scale levers in accordance with this invention. Fig. 4 is a similar detail side elevation showing a modified form of shackle and pivot pin bearing as constructed and arranged in accordance with my invention. Fig. 5 is a detail elevation of the upper end of the shackles and bearings shown in Figs. 3 and 4.

In the accompanying drawings, referring to Figs. 1 and 2, the numeral 2 designates a scale lever having pivot pins 3, 4 and 5 removably secured in position thereon. These pivot pins are rectangular in cross section and have parallel sides so that they have four parallel edges also, each of which is adapted for use by engagement with the pivot pin bearings, as it is only the projecting portions of the pivot pins which are subject to wear. The scale lever 2 is provided with openings 6, 6 through which the pivot pins extend so that when fixed in position an end thereof projects beyond each side of the scale lever 2. A lug or boss 7 preferably is provided on each side of the lever 2 adjacent to each of the openings 6 which contacts with the pivot pin in the adjacent opening therefor, and in the face of the opening 6 in the scale lever 2, adjacent to the lugs 7 and in one face of the lugs 7, a V-shaped groove is provided of the same size and shape as the contacting faces of the pivot pins 3 and 4. A cap 8 having a similar V-shaped groove in one face thereof is secured on the bosses or lugs 7 on each side of the scale lever and screw threaded bolts 9 and nuts therefor are provided to secure the caps 8 in position on the lugs 7, these bolts extending through registering openings in the flanges of the lugs 7 and caps 8. The V-shaped grooves in the bosses 7 and caps 8 are arranged to register and they are of such size as to tightly engage with and clamp the pivot pins in position within the so formed openings 6 in the scale lever 2. As the pivot pins have parallel sides, when the one edge of these pivot pins in operative engagement with the bearings or seats therefor has become worn through extended service or in other manner, the scale lever 2 can be blocked up in the scale pit to remove the weight thereof from the pivot pin. The bolts 9 can then be slackened and the pivot pin slid lengthwise out of the rectangular opening formed by the grooves in the bosses 7 and caps 8. The pin can be quickly replaced therein with another of the four edges in position to be engaged by the pivot pin bearings or when desired a new pin substituted therefor. The bolts 9 are then tightened by turning the nuts on the screw threaded ends thereof and the pivot pin is again in readiness for use. The above described operations are repeated with such of the other two edges of the parallel sided pivot pins as require renewal, so that by means of my improved pivot pin construction each of the four edges of the pins is adapted for engagement with the pivot pin bearings and the necessary changes can be made without removal of the scale lever from the scale pit. The pivot pin 5 also mounted in the scale lever 2 is secured thereon by means of a detachable bearing 10 and cap 11. The bearing 10 and its cap 11 have V-shaped recesses therein arranged as has been described to register and form an opening of rectangular cross section and of the same size as the pivot pin 5 which likewise is rectangular in cross section and has parallel sides. Bolts 12 and nuts 13 are employed to secure the cap 11 on the lever bearing 10 in clamping the pivot pin 5 in position on the scale lever 2 and the lever bearing 10 has lugs or ears 10$^a$ on each end thereof with elongated openings or slots 14 in these ears through which studs 15 extend. The slotted openings 14 permit of adjustment of the bearings 10 and pivot pin 5 lengthwise on the scale lever 2 so as to afford means for rapidly adjusting the scale mechanism in maintaining it in the proper alinement, the nuts on the ends of the studs when tightened into place securely holding the bearing in adjusted position on the scale lever.

Referring now to the construction of Figs. 3 and 4, showing the shackle and shackle bearing for the pivot pins, it will be seen that the end of the scale lever 2 is provided with a pivot pin 5 which is secured in the manner heretofore described in the end of the scale lever 2 by means of a cap 16. The shackles are forked, at one end to form arms 17 between which the pivot pin bearings are secured and the upper end 18 of the shackles is provided with an opening therein through which a pin or bolt 19 extends. Secured between the adjacent sides of the ends 18 of two shackles is a four-sided pivot bearing 20, each of the four sides of this bearing being finished and provided with a seat, preferably formed concave as shown, arranged to engage with a pivot pin when placed in engaging position. On the forked end of the shackle shown in Fig. 3 a single sided bearing 21 is shown, this bearing being secured in position on the shackle by means of the bolt 22 and nut 23. In the shackle shown in Fig. 4 a four-sided bearing 24 is shown, similar in construction to the bearings 20 each of the four sides of the bearing being finished to form a curved seat for engagement with the pivot pins when in assembled position. The lower ends of the arms 17 of the shackle of Fig. 4 have holes therethrough which register with the hole extending lengthwise through the bearing 24 and a pin or bolt 25 is positioned within these registering openings to secure the bearing 24 in position.

In the construction of Figs. 3 and 4, the end of the scale lever 2 is provided with a reinforcing lug or boss 26 which gives a longer bearing for the pivot pin on the lever in the same manner as the lugs 7 and in this way enables the pivot pin being made smaller in cross sectional area without undue loss of strength.

In erecting scales provided with my improved scale levers and pivot pin bearings, the lever mechanism is assembled in the usual known manner after the pivot pins, bearings and shackles are applied thereto as has been described. The scales operate in the same manner as with those in use heretofore in the weighing operations. When for any reason renewal of the pivot pins or pivot pin bearings becomes necessary, it is only necessary to block up the end of the scale lever having the worn or defective pin or bearing and by then releasing the bolts the pivot pins or pivot pin bearings can be removed and renewed without dismantling the scale mechanism. This operation can be quickly effected and when done the scale is again in readiness for use.

The advantages of my invention will be apparent to those skilled in the art.

By the use of my improved scale mechanism each of the four edges of the pivot pins can be utilized before discarding the pin, and the use of taper pins is avoided and made unnecessary, while by the use of my improved shackle construction the use of pivot pin bearings having two or more sides is made possible and the removal and replacement of these bearings without dismantling the scale can quickly be accomplished and in this way a great saving in time and cost of making repairs to the scale is effected. The scale can be maintained more accurately in alinement and adjustment, more accurate weighing is made possible and loss of time in weighing by the scale is avoided and overcome. The use of my improved apparatus also decreases the cost of maintenance owing to the indefinite extension in the life of the wearing parts of the scale.

Modifications in the construction and arrangement of the parts may be made without departing from my invention as defined in the appended claims. The manner of securing the pivot pins in position may be varied and the way in which the shackle bearings are secured to the shackles may be changed, and other variations may be made.

By the term lever it is intended to cover both scale levers and scale beams both of which employ pivots pins, and the specification and claims are to be read with this understanding.

I claim:—

1. In a scale, scale beams or levers, pivot pins removably secured in said beams or levers and shackles for connecting the pivot pins in said beams or levers, said shackles having bearings removably secured thereon, and said bearings having a plurality of bearing surfaces adapted to engage with said pivot pins.

2. In a scale, a scale beam or lever having a transverse opening therethrough, a pivot pin removably secured in the opening and detachable caps on opposite sides of the beam for clamping the pivot pin in position on said beam.

In testimony whereof, I have hereunto set my hand.

ALEXANDER M. GULL.

Witnesses:
PORTIA STUBBE,
CHAS. N. FARIS.